Nov. 21, 1939.  H. W. HEISTERKAMP  2,180,467
AIR CONDITIONING SYSTEM
Filed Sept. 25, 1937  2 Sheets-Sheet 1

INVENTOR.
HERBERT W. HEISTERKAMP
BY
Kwis Hudson & Kent
ATTORNEYS

Patented Nov. 21, 1939

2,180,467

UNITED STATES PATENT OFFICE 2,180,467

AIR CONDITIONING SYSTEM

Herbert W. Heisterkamp, Cleveland, Ohio, assignor to The Bryant Heater Company, Cleveland, Ohio, a corporation of Ohio Application September 25, 1937, Serial No. 165,710

2 Claims. (Cl. 62—129)

This invention relates to improvements in air conditioning systems, and particularly that class of air conditioning systems in which both dehumidifying and cooling are desired and in which the air is dehumidified by causing it to come into contact with an adsorptive material of which silica gel is an example.

An object of the invention is the provision of a system in which the amount of cooling surface or the amount of cooling water is reduced as compared with what has been required heretofore in air conditioning systems of this class.

Figure 1:
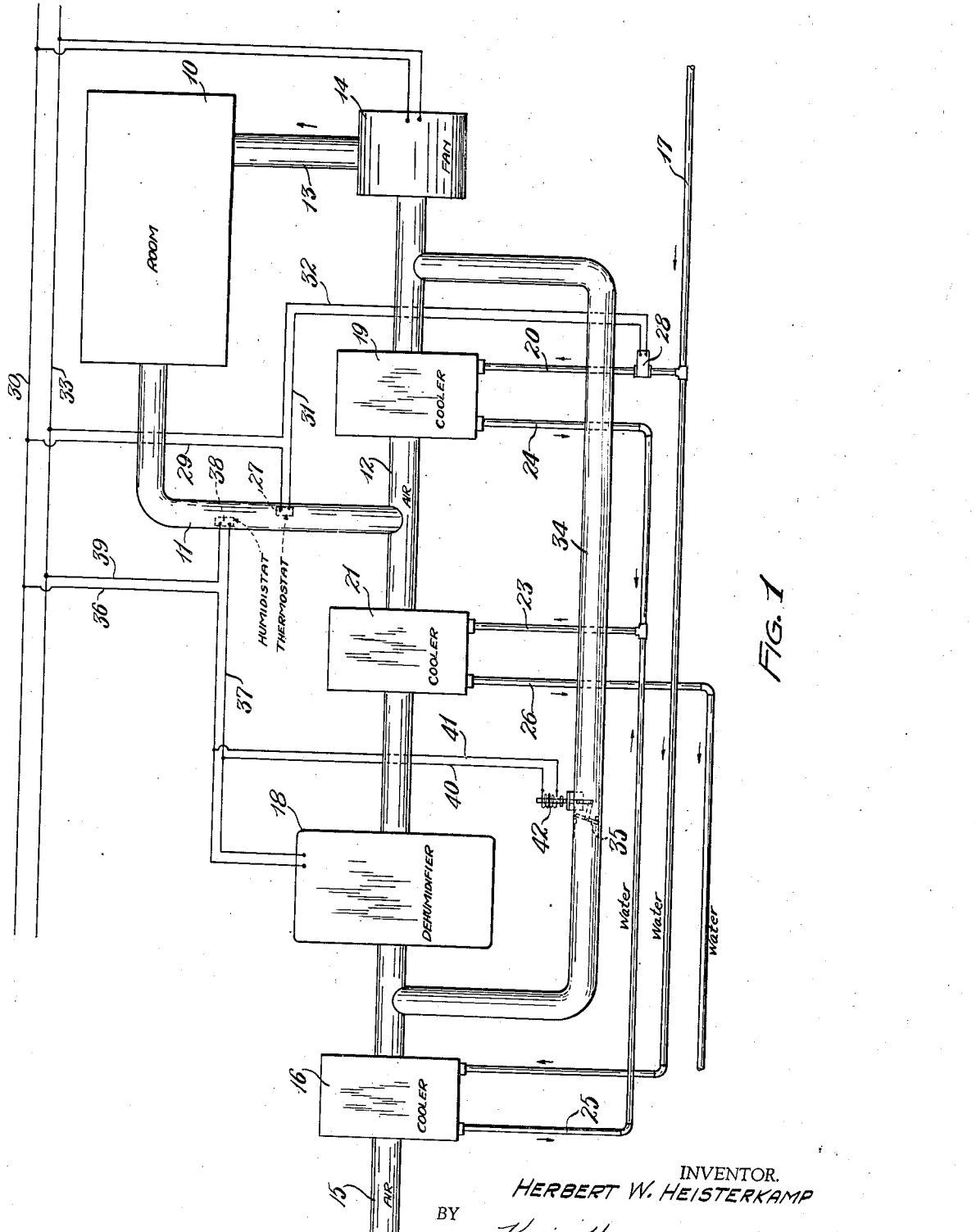
Figure 2:
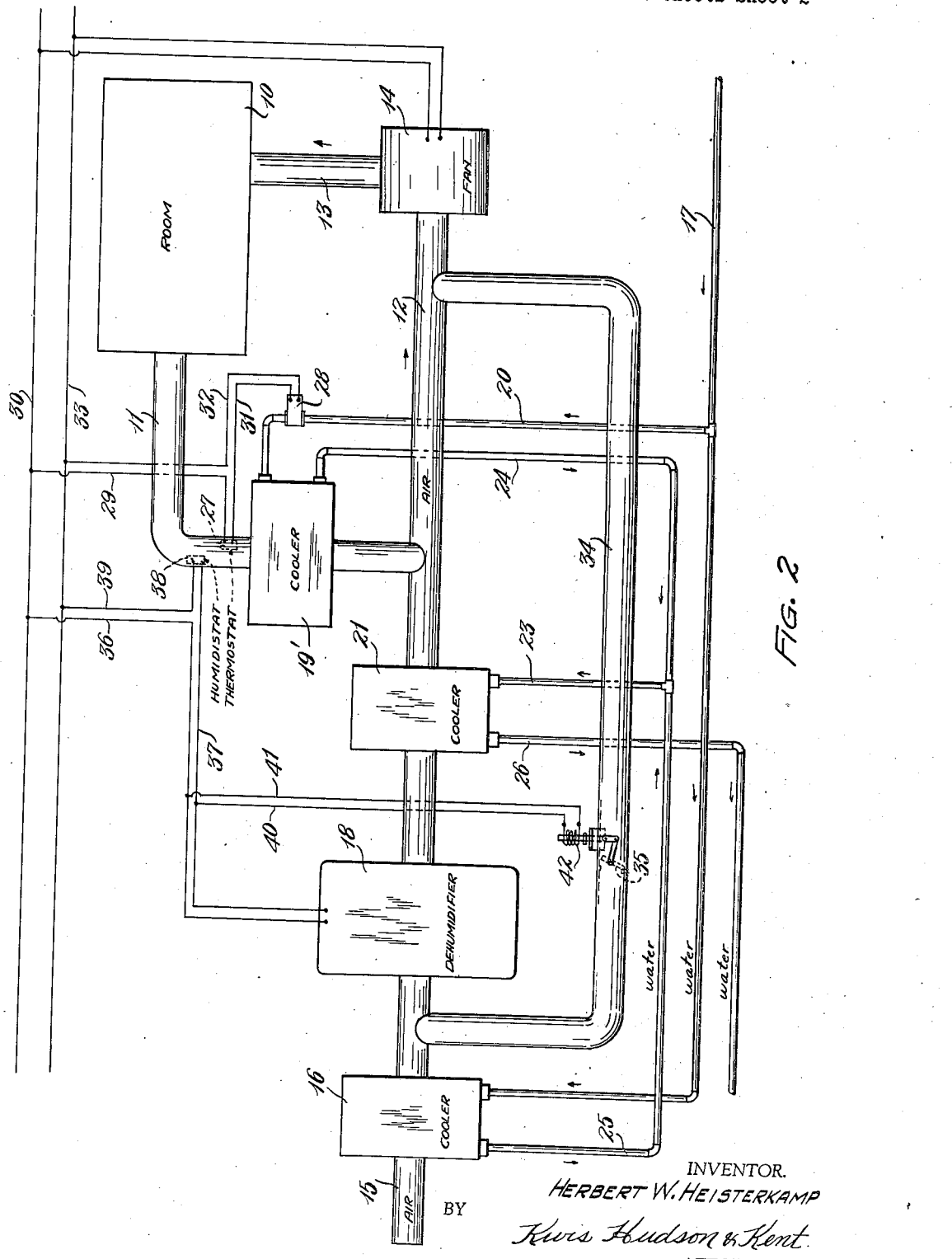

Other objects and features of novelty will appear as I proceed with the description of those embodiments of the invention which, for the purposes of the present application, I have illustrated in the accompanying drawings, in which Fig. 1 is a diagrammatic view of apparatus and connections making up a system embodying the invention, and Fig. 2 is a similar view of a modification.

As is well known in the art, such materials as silica gel have the power to remove moisture from air by a process of adsorption which is substantially an adiabatic process, the latent heat of the moisture adsorbed by the silica gel or similar material being transformed into sensible heat which reappears or is made evident by a heating of the air. Thus, moderately warm or damp air, after being brought into intimate contact with silica gel or the like, is dry but much warmer, the extent of the warming being of the order of .774° F. per grain of moisture removed from each pound of dry air. This is the temperature rise occasioned by the transformation of the latent heat represented by one grain of water vapor plus the so-called heat of adsorption which is of the order of .0343 B. t. u. per grain of water vapor adsorbed. The heat of adsorption may be considered as representing or arising from the work done upon the water vapor in separating it from the air.

It is characteristic of silica gel and other similar adsorptive materials that the cooler and drier the air which is delivered into contact with the adsorptive material, the greater the percentage of the air borne moisture that it removes. Hence the silica gel is made more effective and the operation of the entire air conditioning system more economical if the air previous to being brought into contact with the silica gel is cooled to below its dew point and partially dried, and this can be done by bringing it into contact with coils through which cold water is flowing. Well water at a temperature in the neighborhood of 55° to 60° F. is well suited to this purpose, and its use in this manner is well known in the art.

In the accompanying drawings and in the description to follow I have disclosed a system utilizing silica gel apparatus as a dehumidifying means in such manner that the amount of equipment is reduced and the cost correspondingly lessened.

In the drawings 10 represents the compartment to be air conditioned, that is to be maintained at a predetermined temperature and humidity level. For example, let us assume that the desired condition is 80° dry bulb temperature and 65.8° wet bulb temperature, with 72 grains of moisture per pound of dry air. The compartment 10 constitutes a part of a recirculating system including air conductors 11, 12 and 13 and a fan or blower 14 by means of which the circulation is maintained. 15 is a fresh air conductor which may be considered as connecting with the recirculating line at the junction of conductors 11 and 12. By way of example it may be assumed that the outdoor fresh air is at a dry bulb temperature of 95° with a moisture content of 120 grains per pound of dry air. The fresh air is caused to pass through a precooler 16 supplied with water from a pipe 17 leading from a source of supply, such as a well. Let it be assumed that this water is at a temperature of 56°.

The precooler 16 may be of well known design and construction, and a typical one when supplied with 56° water will cool the 95° air to a dry bulb temperature of 61° and a wet bulb temperature of 59.7°, at which condition the air will contain 75 grains of moisture per pound, the difference between this and the original 120 grains, that is 45 grains, having been precipitated by condensation on the cold surfaces of the precooler.

Conductor 15 conveys this cool and partially dry air to silica gel dehumidifier 18, from which it will issue at a theoretical temperature of 102°, containing 22 grains of moisture per pound of dry air. It is to be understood that the water removing efficiency here assumed is merely typical and is subject to variation in accordance with the proportioning and mechanical design of the dehumidifier.

Referring to Fig. 1, air is withdrawn from compartment 10 through conductor 11 by the suction effect of fan 14. Conductor 11 connects with conductor 12 in which there is placed a cooler 19 similar in construction to precooler 16, and likewise supplied with 56° water from supply pipe 17 and branch pipe 20.

The relation between the quantity of air withdrawn through conduit 11 and that drawn through conduit 15 depends upon the sources of heat and moisture within the conditioned compartment, but a typical relation would be 10,000 C. F. M. (cubic feet per minute) through conduit 11 and 5,000 C. F. M. through conduit 15.

The dry air leaving the dehumidifier 18 passes through a cooler 21 which is supplied through pipe 23 with the water which has previously been used in precooler 16 and cooler 19. A discharge pipe 24 from cooler 19 and a discharge pipe 25 from precooler 16 are connected to pipe 23. Drain pipe 26 carries all of the water away to a suitable place of disposal. The purpose of cooler 21 is to cool the air discharged by the dehumidifier, which is warm for the reasons that have been previously set forth, down to a temperature approaching or below the temperature to be maintained within the compartment 10.

With the cooling water entering coolers 16 and 19 at a temperature of 56° F. it would be common practice to have it leave these coolers at 66°, and we will assume that condition here. Then the water entering cooler 21 through pipe 23 would be at a temperature of 66° F., and the air discharged from cooler 21 into the recirculating line may in a typical case be at a temperature of 73°. If then, for example, the temperature to be maintained within conditioned compartment 10 was 80°, the temperature in conduit 12 would be that resulting from the mixing of 10,000 C. F. M. of 80° air and 5,000 C. F. M. of 73° air, producing 15,000 C. F. M. of 77.67° air.

A thermostat 27, located in conduit 11 of the recirculating line, responds to the changes in temperature of air in conduit 11, and accordingly graduates or modulates the opening of a valve 28 through which water is supplied to cooler 19. Thermostatic controls of this character are well known in the art, and as the control per se forms no part of the present invention, no detail disclosure is given. Electrical connections by means of which the control is effected, as indicated in the drawings, include an electric conductor 29 leading from line wire 30 to the thermostat, a conductor 31 connecting the thermostat with the valve operator, and a conductor 32 running from the valve operator back to line wire 33.

During periods when the humidity in compartment 10 is above the desired level fresh air is drawn through dehumidifier 18 to be fed into the recirculating line. In practice the dehumidifier is provided with a self-contained fan which draws the fresh air through the dense bed of silica gel that is contained in the dehumidifier and discharges it into conduit 15 on the delivery side of the dehumidifier. During periods when the humidity in compartment 10 stands at or below the desired level the fan in the dehumidifier is of course idle and the passage of air through conduit 15 is therefore blocked. In order to feed fresh air to the recirculating line at such times an air by-pass or shunt line is provided around the dehumidifier so that a flow of fresh air into the recirculating line may be induced by the action of fan 14. Such a by-pass conductor is shown herein at 34. It is desirable that this by-pass be closed when the dehumidifier is operating. Consequently I provide a valve 35, shown closed in the drawings. The valve is provided with an electric control which when energized holds the valve closed. When the control is deenergized gravity acts to open the valve.

An electric conductor 36 extends from line wire 30 to the dehumidifier. Another conductor 37 extends from the dehumidifier to a humidostat 38 located in conduit 11 of the recirculating line, and a return conductor 39 connects the humidostat with line wire 33. A pair of shunt conductors 40 and 41 connect conductors 36 and 37 respectively with the terminals of a solenoid 42 constituting the operating means for closing valve 35.

Prior to the present invention it has been the conventional practice to connect by-pass 34 to conduit 12 on the inlet side of the cooler 19. In accordance with the present invention however this connection is made upon the outlet side of the cooler. This simple change results in a surprising economy which I will now demonstrate and explain.

Let it be assumed that the heat load upon compartment 10 is such that air must leave cooler 19 and be delivered into compartment 10 at a temperature of 65°. When the dehumidifier 18 is in operation, and in accordance with the assumptions previously made, air enters cooler 19 at a temperature of 77.67°, and at a temperature rise of the water in going through cooler 19 of from 56° to 66°. The temperature relation is thus expressed as

| Air in | 77.67° | Air out | 65° |
|---|---|---|---|
| Water out | 66° | Water in | 56° |
| | 11.67° | | 9° | which corresponds to a logarithmic mean temperature difference of 10.33°. The heat to be removed from the air amounts to $$15{,}000 \times .018 \times (77.67 - 65) = 3420.9 \text{ B. t. u. per minute}$$

since .018 thermal unit are required to raise one cubic foot of air one degree Fahrenheit. The water required amounts to $$\frac{3420.9}{10 \times 8.34} = 41.02 \text{ gallons per minute}$$

since there are 8.34 pounds of water in a gallon.

This water quantity together with the mean temperature difference is a factor in determining the number of rows of tubes required in cooler 19, counting in the direction of air flow, and the condition for which calculations have just been made is the maximum condition which sets the cooler depth.

Now assume that dehumidifier 18 is not in operation. By-pass conduit 34 is then open. There will now be 10,000 C. F. M. of air passing through cooler 19, uniting with the 5,000 C. F. M. of by-passed air to produce the 15,000 C. F. M. required for delivery to the conditioned compartment. It is required that the mixture of 10,000 C. F. M. cooled from 80° in cooler 19, with the 5,000 C. F. M. of by-passed air at a temperature of 61°, produce 15,000 C. F. M. at 65°. The temperature to which the 10,000 C. F. M. must be cooled is calculated as follows:

$$(t - 61°)\frac{10{,}000}{15{,}000} + 61° = 65°$$

$$t = 67°$$

The amount of heat to be removed in cooler 19 is $$10{,}000 \times .018(80 - 67) = 2340 \text{ B. t. u. per minute}$$

The temperature relation between water and air passing through cooler 19 is represented partially as follows:

| Air in | 80° | Air out | 67° |
|---|---|---|---|
|  |  | Water in | 56° |
|  |  |  | 11° |

Now assume that the by-passed air were to be delivered in the conventional manner to the inlet side of cooler 19. There would now be 15,000 C. F. M. of air passing through cooler 19 composed of 10,000 C. F. M. at 80° and 5,000 C. F. M. at 61°, giving a mixture temperature of 73.67°. This must be cooled to 65°, and the amount of heat to be removed in cooler 19 is 15,000 × .018(73.67 − 65) = 2340 B. t. u. per minute The temperature relation between water and air passing through cooler 19 is represented as follows:

| Air in | 73.67 | Air out | 65° |
|---|---|---|---|
|  |  | Water in | 56° |
|  |  |  | 9° |

It will be seen by inspection therefore that in the heretofore conventional system the difference between ingoing water and outgoing air is 9° as compared with 11° in a system arranged according to the present invention. It will be apparent immediately to those skilled in the art that during those times when air is being by-passed around the dehumidifier the water required by cooler 19 will be less in a system designed according to this invention than in a system designed according to conventional practice, on account of the greater concentration of heat in the entering side and the greater air-to-water temperature on the leaving side. The result is a reduced water consumption during a great deal of the operating time of the system, leading to lowered operating costs.

In Fig. 2 there is shown a variation of the system shown in Fig. 1, the cooler 19 having been removed from conduit 12 and a cooler 19' having been introduced into conduit 11. All other features of the system and all of the reference characters remain the same as in Fig. 1.

The air quantities and temperatures remaining the same as in Fig. 1, it will be seen that since cooler 19' needs now to be large enough only to pass 10,000 C. F. M. of air, its frontal size will become less than that of cooler 19 in conduit 12, for in the case of cooler 19 it was occasionally necessary for the frontal size to be sufficient to pass 15,000 C. F. M. of air, that is during times when dehumidifier 18 was in operation. Moving the cooler from conduit 12 to conduit 11 does not materially affect the mean temperature difference, and therefore the cooling water required is shown by the following calculations:

When dehumidifier 18 is in operation the 5,000 C. F. M. discharged by cooler 21 is at a temperature of 73°. Since it is required that the 15,000 C. F. M. of air entering compartment 10 be at 65°, it is necessary that the 10,000 C. F. M. passing through cooler 19' be cooled to 60.97° in order to produce a mixture temperature of 65° when it is mixed with the 5,000 C. F. M. of 73° air.

The heat to be removed from the air amounts to 10,000 × .018(80 − 60.97) = 3425.4 B. t. u. per minute and the water required amounts to $$\frac{3425.4}{10 \times 8.34} = 41.07 \text{ gallons per minute}$$

The temperature relation is expressed by

| Air in | 80° | Air out | 60.97° |
|---|---|---|---|
| Water out | 66° | Water in | 56° |
| 14° |  | 4.97° |  | which corresponds to a mean temperature difference of 8.75°. These are the conditions which set the cooler depth.

When dehumidifier 18 is not in operation the 5,000 C. F. M. discharged from precooler 16 into conduit 12 by means of conduit 34 is at a temperature of 61°. Since it is required that the 15,000 C. F. M. of air entering compartment 10 be at 65°, it is necessary that the 10,000 C. F. M. passing through cooler 19' be cooled to 67° in order to produce a mixture temperature of 65° when it is mixed with the 5,000 C. F. M. of 61° air. The heat to be removed from the air amounts to 10,000 × .018(80 − 67) = 2340 B. t. u. per minute The temperature relation of water and air passing through cooler 19' is represented as follows:

| Air in | 80° | Air out | 67° |
|---|---|---|---|
|  |  | Water in | 56° |
|  |  |  | 11° |

Inspection and comparison will now show that during those periods of operation in which air is being by-passed around the dehumidifier, the beneficial result of delivering the by-passed air into the system on the outlet side of the last cooler is preserved, whether it be cooler 19 in conduit 12 or cooler 19' in conduit 11, and further when cooler 19' in conduit 11 is used there is the additional advantage that its necessary frontal size becomes reduced.

Having thus described my invention, I claim:

1. In an air conditioning system, an air recirculating line including a compartment in which the air is to be conditioned, an air cooling means in said line, means for introducing dehumidified air into said line on the intake side of said cooling means, and means for introducing fresh cooled outdoor air into said line on the outlet side of said cooling means.

2. In an air conditioning system, an air recirculating line including a compartment in which the air is to be conditioned, a dehumidifier of the adsorption type, an air cooler on the inlet side of said dehumidifier, an air cooler in said recirculating line, means for conducting air through said first cooler and said dehumidifying means and into the line on the intake side of the second cooler, and a conductor for fresh outdoor air extending from the outlet side of said first cooler to the outlet side of said second cooler, thereby by-passing the dehumidifier and the second cooler.

HERBERT W. HEISTERKAMP.